US 6,697,642 B1

(12) United States Patent
Thomas

(10) Patent No.: US 6,697,642 B1
(45) Date of Patent: Feb. 24, 2004

(54) WIRELESS COMMUNICATIONS APPARATUS

(75) Inventor: David R. Thomas, Opio (FR)

(73) Assignee: Texas Instruments Incorporated, Dallas, TX (US)

(*) Notice: Subject to any disclaimer, the term of this patent is extended or adjusted under 35 U.S.C. 154(b) by 288 days.

(21) Appl. No.: 09/619,325

(22) Filed: Jul. 19, 2000

(51) Int. Cl.[7] .................................................. H04B 1/38
(52) U.S. Cl. .................... 455/562.1; 455/522; 455/574; 455/419; 455/90.1; 455/25; 370/337; 370/347; 342/374
(58) Field of Search ................................ 370/337, 347; 455/522, 574, 419, 90.1, 25; 342/374

(56) References Cited

U.S. PATENT DOCUMENTS

| | | | | |
|---|---|---|---|---|
| 5,163,026 A | * | 11/1992 | Peynaud | 367/7 |
| 5,303,240 A | * | 4/1994 | Borras et al. | 370/347 |
| 5,617,102 A | * | 4/1997 | Prater | 342/374 |
| 6,035,209 A | * | 3/2000 | Tiedemann et al. | 455/522 |
| 6,067,460 A | * | 5/2000 | Alanara et al. | 455/574 |
| 6,134,230 A | * | 10/2000 | Olofsson et al. | 370/337 |
| 6,349,204 B1 | * | 2/2002 | Goetz et al. | 455/419 |
| 6,484,015 B1 | * | 11/2002 | Aleiner et al. | 455/90.1 |

OTHER PUBLICATIONS

"Digital Cellular Telecommunications System (Phase 2+); Adaptive Multi–Rate (AMR); Speech Processing Functions".*

"Digital Cellular Telecommnications System (Phae 2+); Adaptive Multi–Rate (AMR); Speech Processing Functions" ETSI EN 301 703 V7.0.2 (1999–12), European Standard (GSM 06.71 version 7.0.2 Release 1998); pp. 2–12.

* cited by examiner

*Primary Examiner*—Sinh Tran
*Assistant Examiner*—David Q Nguyen
(74) *Attorney, Agent, or Firm*—Ronald O. Neerings; Wade James Brady, III; Frederick J. Telecky, Jr.

(57) ABSTRACT

Apparatus for a wireless communication network, comprises: a directional beam antenna, an antenna controller for directing said directional beam antenna in an optimum signal quality beam direction, and coding means operable at two or more coding rates, to switch between said rates responsive to said controller changing said antenna beam direction.

38 Claims, 10 Drawing Sheets

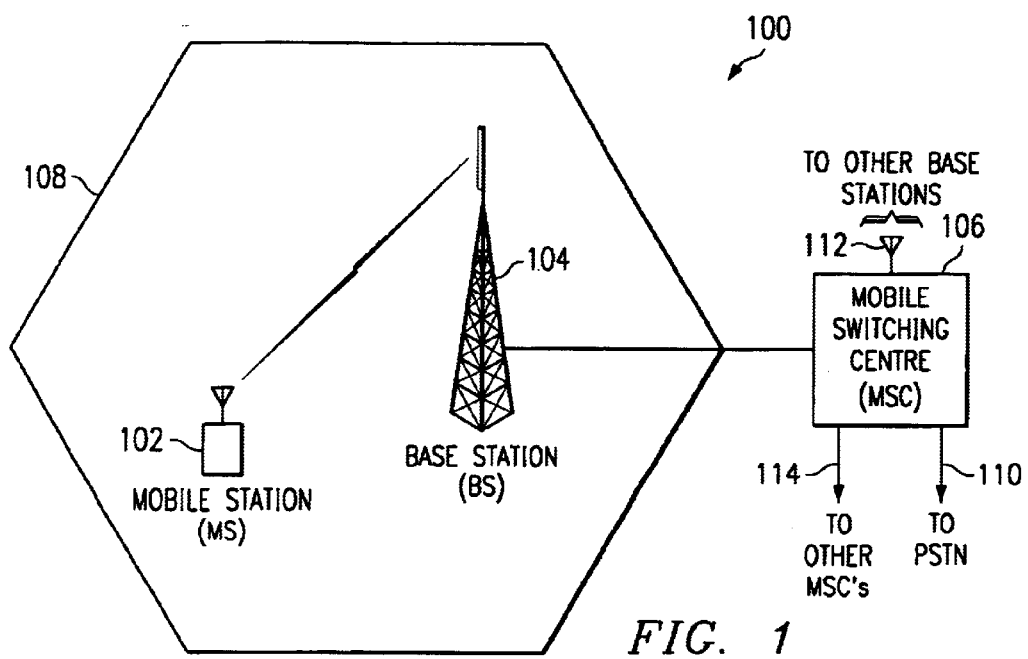
FIG. 1
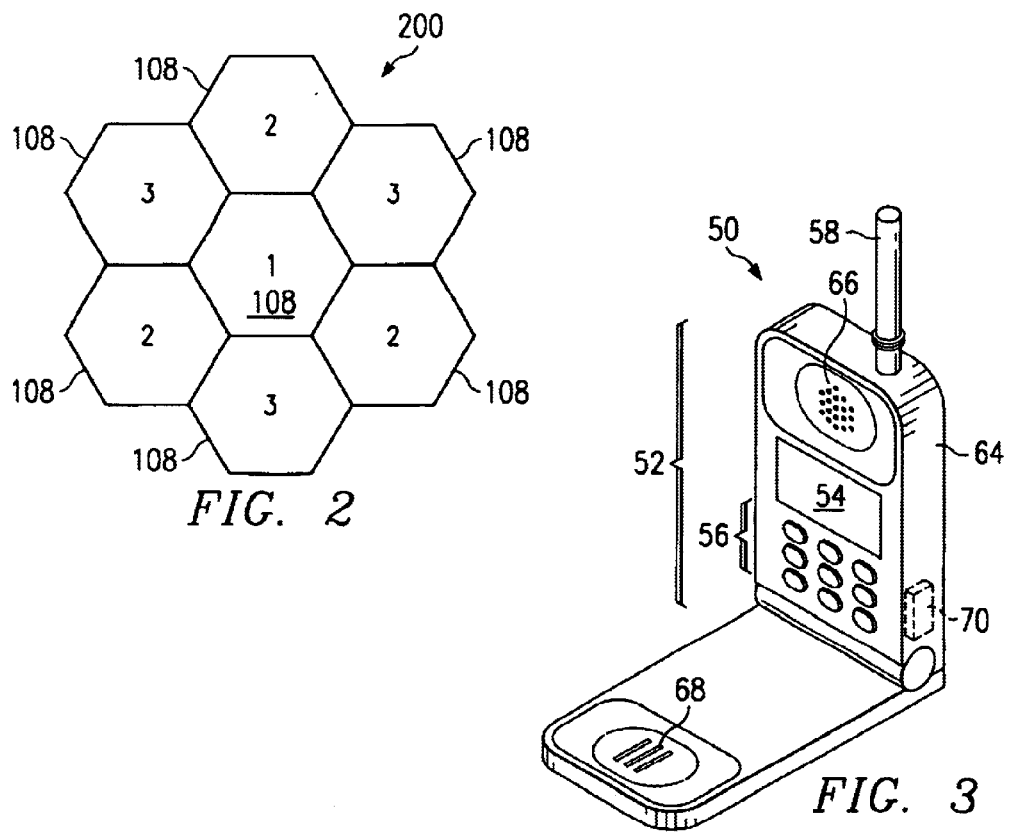
FIG. 2
FIG. 3

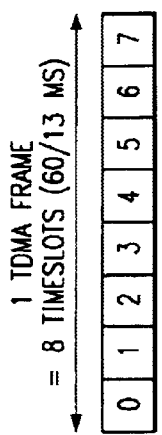
FIG. 9a
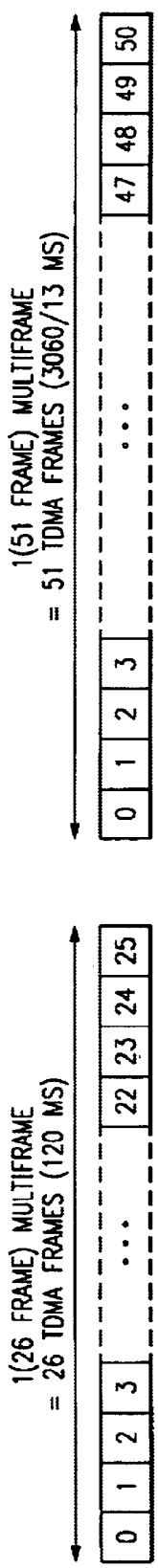
FIG. 9b
FIG. 9c
FIG. 9d
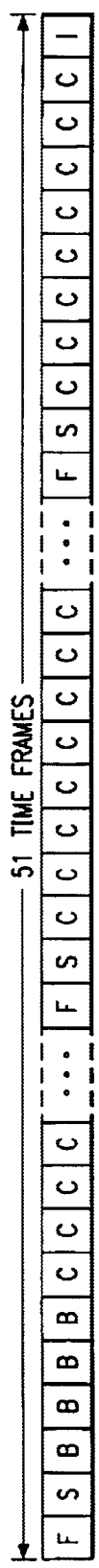
FIG. 9e

WIRELESS COMMUNICATIONS APPARATUS

The present invention relates to wireless apparatus, wireless communications systems and methods of operation therefor. In particular, but not exclusively, the present invention relates to radio telephone communications systems.

Radio telephone communications systems are well known. Examples of such radio systems are cellular telephone systems of which the Global System for Mobiles (GSM) is a particular example.

In common with communication systems in general, radio communication systems have limited available bandwidth. Indeed, the problem of limited bandwidth availability is typically more acute in radio communications systems than in other types of communication systems. Consequently, the bandwidth available for each communication channel set up by the communications system is limited. Generally, there is a trade-off between a high quality communication, such as one utilising a high data rate encoded speech signal, and the available bandwidth. Another limitation is that radio communication systems typically utilise channel coding, such as error detection/correction coding, which is necessary due to the corruption of communications during transmission. Thus, further limitations are placed on the data rate available transmissions such as for speech coding.

In radio telephone systems, it is known to operate at different speech coding rates and it has been proposed to switch between different coding rates in dependence upon the quality of the radio communication channel; (see European Telecommunications Standard Institute draft specification EN301XXXV2.0.0 (1999–02) "digital cellular telecommunication system (phase 2+); adaptive multi-rate speech processing functions; general description" (GSM) 06.71 v 2.0.0 release 1998) incorporated herein by reference. This document proposes the use of higher data rate speech encoding for communication channels having high quality, that is to say a low level of corruption and hence reduced level (number of bits) of channel coding, and vice versa.

The proposed operation of the system disclosed in the draft specification referred to above requires the channel quality for communications between a cellular radio telephone base station and a mobile station to be measured by a channel quality estimation unit by way of monitoring the signal received at the respective base station and mobile station. Based on the measured signal quality, the base station can send an instruction to a mobile station to switch the coding rate for transmissions therefrom, and also an indication of the coding rate which the base station is using for the downlink (base station—mobile station) channel. Additionally, the mobile station may request the base station to switch rates by sending an appropriate command request and also inform the base station as to what coding rate the mobile station is using for transmission on the uplink (mobile station—base station channel). Thus, before each coding rate switch, the appropriate signal quality has to be measured and suitable requests and commands exchanged between the mobile station and the base station.

In the applicant's co-pending European Patent Applications Nos 99 401571.7 and 99 401573.3, radio apparatus, communications systems and methods for operation thereof are disclosed in which a steerable beam antenna for a radio apparatus is utilised to steer an antenna beam in a direction corresponding to an optimum signal or communications quality. The apparatus searches for the optimum signal quality direction in accordance with a disclosed search strategy. The particular details of operation of the steerable beam antenna need not be disclosed for an understanding of the instant invention and shall not be described further. It is merely sufficient to understand that an optimum antenna beam direction can be identified and the antenna beam directed in that direction.

Another example of the use of a directional beam antenna is disclosed in U.S. Pat. No. 5,303,240, issued Apr. 12, 1994.

Embodiments of the present invention seek to address one or more of the drawbacks or limitations of known wireless apparatus and systems and to preferably improve the performance thereof.

Particular and preferred aspects of the present invention are set out in the accompanying independent and dependent claims. Combinations of features from the dependent claims may be combined with features of the independent claims as appropriate and not as explicitly set out in the claims.

In the following, the term directional beam antenna refers to an antenna for which the radiation pattern for transmission and reception may be varied from an omni-directional radiation pattern to a radiation pattern having a particular beamwidth and direction. The width and direction of the beam may be independently varied.

In accordance with a first aspect of the present invention, there is provided a first wireless communications apparatus for a wireless communications system comprising:
   a directional beam antenna;
   an antenna controller for directing said directional beam antenna in an optimum signal quality beam direction; and
   coding means operable at two or more coding rates, and further operable to switch between said rates responsive to said controller initiating a change in said antenna beam direction.

In accordance with a second aspect of the present invention there is provided a method for operating a first wireless communications apparatus having a directional beam antenna in a wireless communications network, the method comprising:
   directing said directional beam antenna in an optimum signal quality beam direction; and
   switching between two or more coding rates for communications by said wireless apparatus responsive to initiation of a change in said antenna beam direction.

In accordance with a third aspect of the invention, there is provided apparatus for a wireless communications network, the apparatus comprising:
   means for determining a period of inactivity for said apparatus;
   means for determining signal quality of a signal received during said period of activity; and
   coding means operable at two or more coding rates and responsive to a determined signal quality to switch between coding rates.

In accordance with a fourth aspect of the invention, there is provided a method or operating wireless apparatus, comprising:
   determining a period of inactivity for said radio apparatus;
   determining signal quality of a signal received during said period of inactivity; and
   switching between two or more coding rates for communications by said wireless apparatus responsive to a determined signal quality.

Embodiments in accordance with various aspects of the invention initiate rate switching in accordance with signal quality without the need for further processing of the received signals, such as signal quality measurement and may even obviate the need for the exchange of command/request communications between the first wireless apparatus and a wireless communication systems to switch coding rates. Furthermore, monitoring and measurement of signal quality may be conducted in periods of inactivity. Thus, changing the coding rate may be achieved more quickly with less processing than required with the previously proposed systems. Furthermore, such an embodiment benefits from a synergy between the optimisation of beam direction providing improved signal quality and the initiation of coding rate switching.

In a preferred embodiment, the third aspect of the invention includes a directional beam antenna; and an antenna controller for directing said directional beam antenna in an optimum signal quality direction in accordance with said determined signal quality, said coding means responsive to said antenna controller initiating a change in said antenna beam direction to switch between said coding rates. Thus, antenna beam switching may be conducted during inactive periods, thereby not imposing a further processing overhead during transmission or reception of speech or data, i.e. traffic signals.

Preferably, the signal is received whilst the period of inactivity comprises a broadcast signal. In an embodiment of the invention operable for a cellular radio communications system, the broadcast signal comprises a signal from a base station with which said apparatus is in primary communication. Optionally, the broadcast signal comprises a signal from any one of one or more base stations for cells adjacent the cell defined by said base station with which said radio apparatus is in primary communication.

Suitably, the period of inactivity comprises a period determined as being designated for the transmission and/or reception of redundant information. In aaparatus operable for speech communication, the period of inactivity comprises non-active segments during transmission and/or reception of silence identity (SID) information. In particular, the non-active segments comprise an empty frame and/or part thereof during transmission of SID frames.

Optionally, for apparatus operable to transmit data, the period of inactivity comprises a period subsequent to an end of data signal transmitted and/or received by said radio apparatus.

In a preferred embodiment, the coding means is a speech coder, sometimes referred to as a speech codec. For such a preferred embodiment, the coding means is operable to switch to higher rate speech coding responsive to said antenna controller directing said directional beam antenna to said optimum signal quality beam direction. For a communication system in which the available bandwidth for any communication is fixed, an increase in the coding rate for the signal e.g. speech signal, would result in a corresponding decrease in the bit rate for channel coding. A reduction in the channel coding bit rate is consistent with there being an improvement in the signal or communication quality, since there would be less need for error correction/detection. Thus, the synergy between the optimisation of beam direction providing improved signal quality and limitation of higher speech coding is clearly expedited.

Typically, the first apparatus is operable to communicate a request to a second wireless communications apparatus in communication with the first apparatus to utilise said higher rate coding responsive to said antenna controller directing said antenna beam to said optimum signal quality beam direction. Correspondingly, the coding means is operable to switch to higher rate coding responsive to a rate switch request communicated from second apparatus in communication with the first apparatus initiated by a change in antenna beam direction for a steerable beam of said second apparatus.

Thus, second apparatus in communication with the first apparatus can be instructed or can instruct a coding rate switch based on antenna beam switching and without further measurement of the signal communication quality.

Typically, the first apparatus is operable to utilise a coding rate corresponding to a coding rate utilised by the second apparatus in communication with the first apparatus, such that both parties to a communication utilise the same coding rates.

In a particularly advantageous embodiment, the first apparatus further comprises an orientation sensitive sensing means, the coding means being responsive to a signal from the sensing means indicative of a change of orientation of the first apparatus to inhibit the coding means switching rates. Additionally, or optionally, the first apparatus may be responsive to change of orientation to inhibit requesting a coding rate switch. Such an advantageous embodiment reduces the likelihood of the coding rate being increased at around the time that a decrease in signal communication quality, and thus a corresponding need for the coding rate to be reduced in order to compensate for the reduction in signal or communication quality, occurs such as when the first apparatus is moved in a manner to move the antenna beam direction away from the optimum beam direction.

In particular, the coding means may be responsive to a signal from the sensor indicative of a sudden change of orientation of the first apparatus. Such an embodiment would inhibit coding rate switching only when there was a high likelihood of a deterioration in signal or communication quality due to rapid changes in orientation of the first apparatus. Additionally, inhibiting coding rate switching due to sensing changes in orientation of the first apparatus reduces undesirable oscillation between coding rates.

In a fifth aspect of the present invention there is provided a first wireless communications apparatus for a wireless communications network, comprising:

coding means operable at two or more coding rates and responsive to control signals to switch between said two or more coding rates; and a motion sensing means;

said coding means responsive to a signal from said sensing means indicative of a change of orientation of said first apparatus to inhibit switching of said coding means between said two or more rates.

In a sixth aspect of the present invention there is provided a first wireless communications apparatus for a wireless communications network, comprising:

coding means operable at two or more coding rates and responsive to control signals to request a transmitter in communication with said first apparatus to switch between one of two or more coding rates; and an orientation sensitive sensor;

said coding means responsive to a signal from said sensing means indicative of a change of orientation of said first apparatus to inhibit said request to said transmitter.

In a seventh aspect of the present invention there is provided a first wireless communications apparatus for a wireless communications network, comprising:

coding means operable at two or more coding rates and responsive to control signals to switch between said two or more coding rates; and motion sensing means;
said coding means responsive to a signal from said motion sensing means indicative of said first apparatus being stationary to switch or request switching between non-adjacent coding rates.

In a particular embodiment of the present invention, there is provided a radio communications station comprising a user interface including a display, a keypad or keyboard for inputting data or commands to the communications station, a transceiver and an antenna operably coupled to the transceiver, and further comprising apparatus as described in the foregoing paragraphs. Preferably, the communications station is a mobile station.

Embodiments of the invention may comprise computer programs, or computer readable media embodying computer programs.

The term "coding" is used throughout the specification and claims to include coding and decoding as the context permits.

Although the present invention finds particular application to cellular radio systems and mobile stations therefor, it also finds application to other wireless communication systems and apparatus, for example Public Mobile Radio (PMR), and the terms wireless or radio communication system and wireless or radio telephone systems include such other systems.

Specific embodiments of the invention will now be described, by way of example only, and with reference to the accompanying drawings, in which:

FIG. 1 is a diagrammatic illustration of a cellular radio telephone system;

FIG. 2 is a diagrammatic illustration of a cell cluster in a cellular radio telephone system;

FIG. 3 is an illustration of a radio telephone handset;

FIG. 9 is a diagrammatic representation of the TDMA structure of GSM signals;

Figure 4:
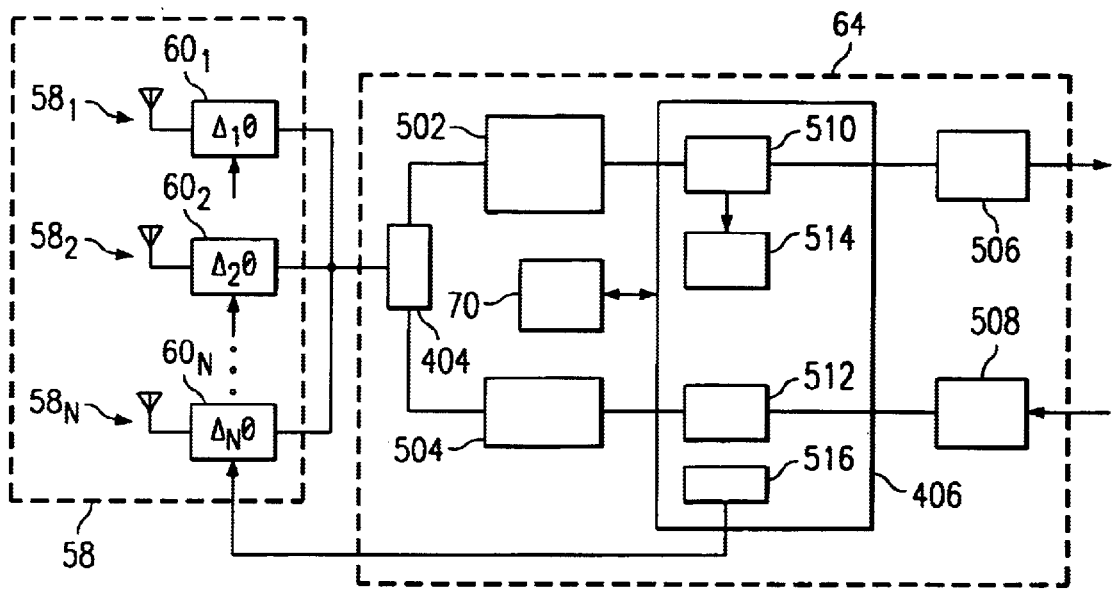
FIG. 4 is a diagrammatic illustration of a mobile station having a directional beam antenna and control circuitry therefor.

By way of example only, embodiments of the invention will now be described with reference to cellular communication systems. The terms radio telephone and mobile station may be used interchangeably, the term mobile station encompassing wireless apparatus such as wireless enabled computing devices having greater functionality than a radio telephone. The basic architecture of a cellular radio telephone system will now be described with reference to FIGS. 1 and 2 of the drawings.

Cellular radio telephone system 100 illustrated in FIG. 1 has three main components: mobile stations (MS) 102 (which term shall be used to include vehicular mounted cellular telephones, portable cellular telephones, and generally radio apparatus used by a subscriber to a radio communications network), base stations (BS) 104,112 and mobile switching centres (MSC) 106. A mobile station 102 communicates with a base station 104 within a radio cell 108. The base station 104 communicates with the mobile switching centre 106, which routes calls to and from the Public Switched Telephone Network (PSTN) 110, base station 104, other base stations 112 and other mobile switching centres 114. In this manner, a mobile station 102 can communicate with mobile stations in the system, or PSTN subscribers.

In general, a radio communications system, such as a cellular telephone system, has a region of the radio frequency spectrum allocated to it by a national or occasionally an international authority. Since the allocated radio frequency spectrum is limited to a particular frequency range or ranges, cellular radio systems operators maximise the use of the radio spectrum by restricting the coverage area of a base station 104. The coverage area of a base station 104 is generally termed a cell 108. Cells 108 are usually arranged in clusters 200, and the allocated radio spectrum is divided between individual cells in the cluster. Patterns of clusters 200 are repeated throughout the coverage area of the cellular radio system 100. A 7 cell cluster 200 is schematically illustrated in FIG. 2. However, it should be noted that although the cells 108 are shown having a regular hexagonal shape in practice they are irregular due to the non-homogenous propagation of radio waves through typical terrestrial environments, and usually overlap each other. Each cell operates in one of group of frequencies labelled 1,2,3 such that adjacent cells do not operate on the same group of frequencies. Optionally, each cell is divided into sectors, typically 3 of angle 120°, and the frequency groups are distributed such that adjacent sectors do not share the same frequency groups.

In order to increase the user capacity of a cellular system it is important to be able to re-use frequencies throughout the cellular system. However, re-use of frequencies is restricted by the need to avoid interference between different cells using the same frequencies, so-called co-channel interference.

Various methods have been employed to reduce co-channel interference and increase system capacity. For example, the base station 104 may transmit adaptive power control signals which dynamically control the mobile station 102 transmit power so that it is kept just above the minimum level necessary to ensure acceptable transmission quality between the mobile station 102 and the base station 104. Additionally, the overall cell size may be reduced, and the level of power transmitted by respective base stations 104 and mobile stations 102 can be correspondingly reduced, in order to allow for greater re-use of the available radio frequency spectrum. However, a reduction in transmit power can lead to reduced quality of reception and consequently reduced data bandwidth since it is likely to be necessary to repeat transmitted data which failed to transmit correctly a first time more often than with a higher transmit power. Additionally, if cells are smaller then it would be necessary to hand-off a mobile radio apparatus, such as a vehicular mounted cellular telephone, frequently. Such frequent hand-offs between cells may put an unacceptable processing overhead on the cellular radio system.

Referring now to FIG. 3, there is shown a schematic illustration of a typical mobile station 102 embodied as a radio telephone handset 50 for a cellular radio system 100. The handset 50 comprises a housing 64, housing a user interface 52 including a display 54, for example a liquid crystal display, and a keypad 56 typically comprising the numerals 0 through to 9 and some special function buttons. Additionally, the user interface comprises acoustic ports 66 and 68, respectively disposed for a speaker and microphone of the handset. The housing 64 also supports an antenna 58 for the handset 50, coupled to a transceiver (not shown) enclosed within the housing 64.

Also enclosed within the housing 64 is an orientation sensitive sensor 70 for sensing changes in orientation of the handset 50. Optionally, or additionally, sensor 70 may be a motion sensitive sensor for sensing motion of the handset 50.

In order to improve communications and signal quality and to conduct communications at reduced signal power levels compared to conventional power levels thereby reducing the possibility of co-channel interference such that frequency re-use may be increased, the use of steerable narrow beam width directional antennas has been proposed. Such use has been proposed in U.S. Pat. No. 5,303,240 issued Apr. 12, 1994 and the Applicant's co-pending European Patent Applications Nos 99 401471.7 and 99 402573.3, all incorporated herein by reference.

An example of a cellular radio telephone incorporating a directional beam antenna will now be described with reference to FIG. 4 of the accompanying drawings.

Radio telephone housing 64 includes an antenna switch 404 coupled to the radio frequency front end of the receive and transmit chains 502, 504 respectively of the radio telephone 50. The radio frequency front end 502 typically comprises a low noise amplifier and filter, a first mixer, an intermediate frequency filter and second mixer. The first and second mixers receive respective inputs from a voltage controlled oscillator and a frequency synthesiser in order to down convert received communications signals to a baseband frequency. Similarly, the radio frequency front end for the transmit chain 504 comprises a radio frequency power amplifier, control circuitry for applying power levelling control and modulating a radio frequency carrier input to the radio frequency power amplifier, together with a voltage controlled oscillator and frequency synthesiser for generating the radio frequency carrier for input to the power amplifier. Control circuitry 406 for controlling the functions of radio telephone 50 may be embodied as a suitably configured processing means such as a general purpose processor or computing means, a digital signal processor, discrete logic circuitry or a combination of the foregoing, for example.

The control circuitry 406 comprises a demodulator/decoder unit 510, for demodulating and decoding received signals. The function of the demodulator/decoder 510 is to output signals to the audio output chain 506 typically comprising an audio filter, audio power amplifier and speaker. The demodulator/decoder 510 operates in accordance with a demodulation and decoding scheme suitable for the particular radio communications system in which the radio telephone is operating. Since the particular modulation or decoding scheme is not relevant to the instant invention no further reference to such schemes will be made, except to say that the purpose is to output a suitable audio signal derived from a received signal. Similarly, the control circuitry 406 also comprises an encoder/modulator unit 512 which receives an audio signal from the audio receive chain 508 and suitably encodes and modulates the signal ready for outputting to the transmit chain radio frequency front end 504. For reasons mentioned above, no further reference will be made to particular encoding/modulation schemes.

Control circuitry 406 also comprises a signal quality level measuring unit 514, which receives an output from demodulator/decoder 510 representative of the received signal. The signal quality level measurement unit 514 may determine signal quality in a number of ways. For example, the received signal strength may be monitored giving a Received Signal Strength Indicator (RSSI), or the bit error rate, the signal to noise ratio, or carrier to noise ratio of the received signal, may be measured. The receive signal quality level, for example RSSI, may be stored for comparison with a later received signal and/or compared with a threshold level.

The control circuitry 406 also comprises an antenna controller 516 for forming and steering the beam of antenna 58. In one example antenna 58 comprises a plurality of antenna elements $58_1, 58_2, \ldots, 58_n$, each antenna element being driven through respective phase delay and gain circuitry $60_1, 60_2, \ldots, 60_n$. The phase delay and gain introduced by respective phase delay and gain elements 60 is controlled by antenna controller 516. Such antenna arrays are often termed "adaptive antennas". The directional antenna 58 need not comprise an electronically steerable beam antenna having a plurality of antenna elements, but may be mechanically steerable, or a combination of mechanically and electrically steerable. Under control of antenna controller 516, the radiation output from antenna 58 may be formed into a relatively narrow beam, and that beam steered to a desired direction. For typical radio communications system networks the beam need only be steered in the azimuthal direction, that is to say substantially horizontal to the earth's surface. However of course, the elevation of the beam may also be steerable should that be required, although the increased complexity required to provide an extra steerable direction may preclude such a feature on commercial grounds. Nevertheless, it can be envisaged that certain applications, such as satellite communications applications, may require both azimuthal and elevational steerability.

Radio telephone 50 also includes a motion or orientation sensor 70 which is coupled to processing circuitry 406 for providing a signal indicative of motion or orientation of the radio telephone 50. Preferably, the motion sensor is sensitive to accelerative motion.

A preferred embodiment of the invention is operable in a time division multiple access (TDMA) radio communications system such as the GSM (Global System for Mobiles) cellular network, as will hereinafter be described with reference to FIG. 9.

The GSM cellular telephone network operates over an up-link band of 890 to 915 MHz, and a down-link band of 935 to 960 MHz, and is commonly referred to as GSM 900. An alternative GSM network operates at around 1800 MHz and is termed GSM 1800. The GSM network uses TDMA, and respective up-link and down-links are separated into separate radio frequency channels. The carrier frequency for each channel is separated by 200 KHz from adjacent channels, and each of the radio frequency channels is divided into time slots of approximately 577 microseconds (15000/26 microseconds) duration. These time slots are grouped together in sets of eight consecutive time slots as one TDMA frame. These frames are then grouped together in one of two different ways to form multi-frames. The TDMA structure will now be described with reference to FIG. 9.

FIG. 9(a) schematically illustrates a single TDMA frame having eight time slots with an overall duration of approximately 4.615 milliseconds, each time slot having a duration of approximately 577 microseconds. Single TDMA frames may be grouped together to form either a 26 TDMA frame multi-frame having an overall duration of 120 milliseconds as shown in FIG. 9(b). Alternatively, the single TDMA frame may be combined as illustrated in FIG. 9(c) to form a 51 frame multi-frame having a duration of approximately 235.38 milliseconds. Each numbered frame of FIG. 9(b) and (c) comprises a single TDMA frame of FIG. 9(a). The 26 frame multi-frame illustrated in FIG. 9(b) is used for traffic channels and their associated control channels, and has each slot designated as shown in FIG. 9(d) where Ti is a time frame number i for traffic data, A is dedicated for the so-called slow associated control channel (SACCH) and I is an idle frame. A 51 TDMA frame multi-frame is used for the control channel and is shown in FIG. 9(e), in which; F is a slot dedicated to a frequency correction channel, S indicates a slot for the synchronisation channel, B indicates a broadcast control channel (BCCH), C is for the common control channel and I is an idle frame.

Traffic channels carry either encoded speech or data, and are transmitted in both the up-link and down-link direction. The control channels are transmitted in the down-link direction only, and carry signalling and synchronisation data between the base station 104 and the mobile station 102.

It is a requirement of the GSM system that the BCCH carrier frequency signal is continuously transmitted in all time slots without variation of the RF power level, European Telecommunications Standard (ETS) 300 578 "European Digital Cellular Telecommunications System" (phase 2): radio subsystem link control (GSM 05.08), page 18. Maintaining transmission of the BCCH carrier is intended to enable mobile stations to be able to measure the received signal level from surrounding cells by tuning and listening to their respective BCCH carriers. Provided that the mobile station is able to tune to a list of BCCH carriers indicated by the network, it will be able to listen to all possible surrounding cells providing that its list is sufficiently complete. This is useful for the purposes of handover and to determine the appropriate cell with which to communicate based upon the received signal level.

It is known that speech has a non-continuous nature, and that speech channels carry only one direction of the conversation between two people at any one time. Thus, on average the channel will only be carrying speech for less than half the time it is in use. This fact is exploited in GSM by using discontinuous transmission (DTX). In discontinuous transmission only speech frames which contain samples of "active" speech are transmitted. Discontinuous transmission is implemented using a voice activity detector, located in the audio receive chain 508 of FIG. 4, to determine when actual speech is present. However, an entirely silent period is disconcerting to a listener since not even background noise associated with the transmitting party is heard. The sudden switching from voice, including background noise, to silence is disturbing to a receiving party. In order to overcome this problem the silent frames are replaced by frames filled with so called "comfort noise" which is set to match the amplitude and spectrum of the background noise. Control circuitry 406 is configured to analyse the background noise associated with a transmitting party, in order to determine the comfort noise information. The comfort noise information is then sent in the silent period in so called silence identification (SID) frames, to the receiving party (via base station 104 or mobile station 102 such as radio telephone) where the noise is regenerated. The "comfort noise" information is sent periodically in the silent period and does not necessarily take up the whole of the silent period. In accordance with an embodiment of the invention, advantage is taken of the existence of silent periods, and the periodic or non-continuous transmission of "comfort noise" information. During silent periods, a mobile station in accordance with an aspect of the invention is able to monitor the BCCH carrier frequency signal in order to determine the received signal quality level, e.g. RSSI.

Figure 5:
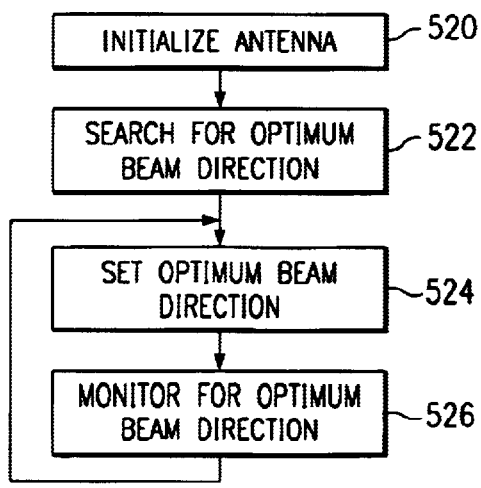
FIG. 5 is a flow chart for operating the mobile station illustrated in FIG. 4.

An overview of the operation of a directional beam antenna will now be provided with reference to FIG. 5 of the accompanying drawings.

Antenna controller 516 of control circuitry 406 is configured to be operable, typically by suitable computer program instructions, in accordance with the flowchart illustrated in FIG. 5. At step 520, the antenna is initialised to operate in an omni-directional mode in order to set up communication with at least one base station 104, and typically more than one base station. Typically, such initialisation of the antenna will occur when the radio telephone 50 is first activated, or when the radio telephone 50 is handing off a communication between one cell and another cell. Additionally, initialisation of the antenna into an omni-directional mode may also occur in response to a sudden or catastrophic degradation in signal quality whilst the antenna is operating in a narrow beam mode. The reduction in signal quality may be in the signal received by the radio telephone 50 or may be in respect of a signal communicated from the radio telephone and received at a base station 108, the switch to omni-directional mode operation being in response to a request from the base station 108 to the radio telephone 50, for example.

At step 522 a search for a beam direction providing optimum signal quality for communications between the radio telephone 50 and the base station 108 is initiated. As described with reference to FIG. 4, the control circuitry 406 includes a signal quality level measurement unit 514 for measuring the quality of a received signal. In the following example, the signal quality level measurement will be based on received signal strength giving a Received Signal Strength Indicator (RSSI) of the broadcast control channel (BCCH) in a GSM system. Maintaining transmission of the BCCH carrier signal is intended to enable mobile stations to be able to measure the received signal level from surrounding cells by tuning and listening to their respective BCCH carrier. This is useful for the purposes of handover and to determine an appropriate cell with which to communicate based upon the received signal level. Such a constant level RF signal may also be utilised to provide a RSSI for signals received by radio telephone 50 for each beam direction of a directional antenna. Optionally, a training signal may be provided by base stations which can be picked up by a radio telephone 50 in order to determine signal quality, see U.S. Pat. No. 5,303,240.

Various search strategies may be employed at step 522 to form and steer an antenna beam in different directions. The formation and steering of the antenna beam is by appropriate phase and amplitude control of the signals radiated by respective antennas $58_1 \ldots 58_n$ by phase and amplitude control circuits $60_1 \ldots 60_n$, respectively. Operation of phase and amplitude circuits $60_1 \ldots 60_n$ is controlled by antenna controller 516 which is typically configured in accordance with a computer program. A suitable search strategy is to divide the omni-directional antenna path into respective half-plane directions to determine in which half-plane the greatest RSSI is received. Having identified which half-plane has the greatest RSSI, that half-plane is divided into suitable sectors, for example 90° sectors or 60° sectors, and a suitable 90° or 60° antenna beam formed and steered to respective sectors. The sector having the greatest RSSI may then be further sub-divided or that sector assigned to be the optimum antenna beam direction at step 524.

At step 526 the radio telephone 50 periodically monitors other antenna directions to determine whether or not they provide better signal quality than the currently assigned optimum antenna beam direction. Suitably, the monitoring of other antenna beam directions is conducted during time periods in which no useful information is received by the radio telephone 50, for example unused time slots in a Time Division Multiple Access (TDMA) system. Optionally, training slots can be defined within a TDMA system during which a constant level training signal is transmitted and received by the radio telephone 50 for monitoring the communication signal quality in a particular direction. Such a system would require a specifically adapted TDMA system such as proposed in U.S. Pat. No. 5,303,240. Should an antenna beam direction giving a better RSSI than the currently assigned optimum antenna beam direction be identified, then the operation of antenna controller 516 flows to step 524 of the flowchart in which the new antenna beam direction is assigned to be the optimum antenna beam direction.

Although not illustrated in the flowchart of FIG. 5, should a sudden or catastrophic degradation in signal quality be observed, then operation of antenna controller 516 will proceed to step 520 of the flowchart and the antenna initialised to operate in an omni-directional mode. The search for an optimum antenna beam direction would then re-start.

In a preferred embodiment of the invention, the search for optimum beam direction is undertaken during one or more SID frames, and an algorithm for setting up and controlling a directional antenna in accordance with the preferred embodiment suitable for a GSM radio network system or the like, will now be described with reference to the flow chart illustrated in FIG. 10.

Figure 10A:
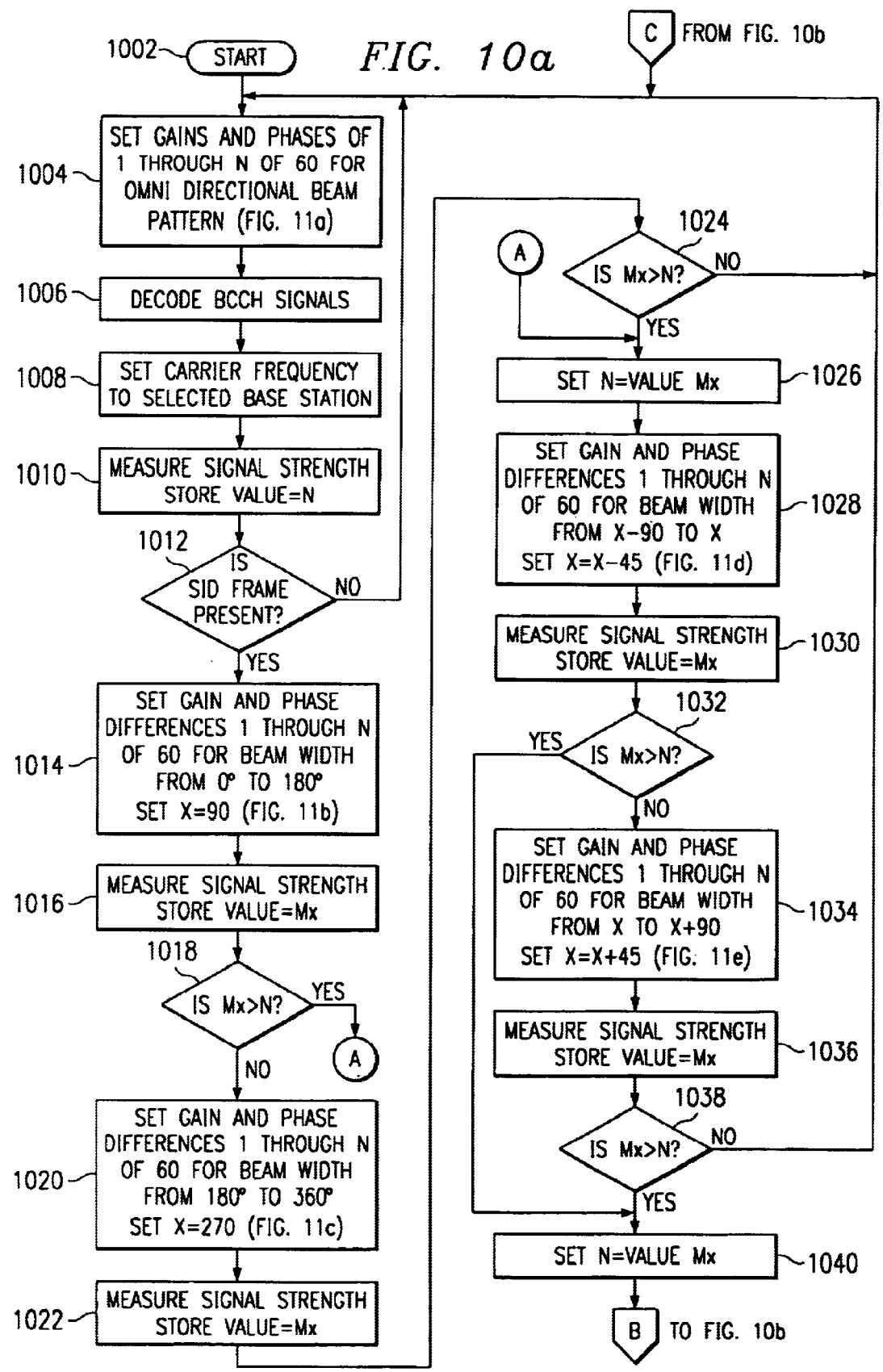
FIG. 10 is a flowchart for setting up and controlling a directional beam antenna in accordance with an embodiment of the invention.
Figure 10B:
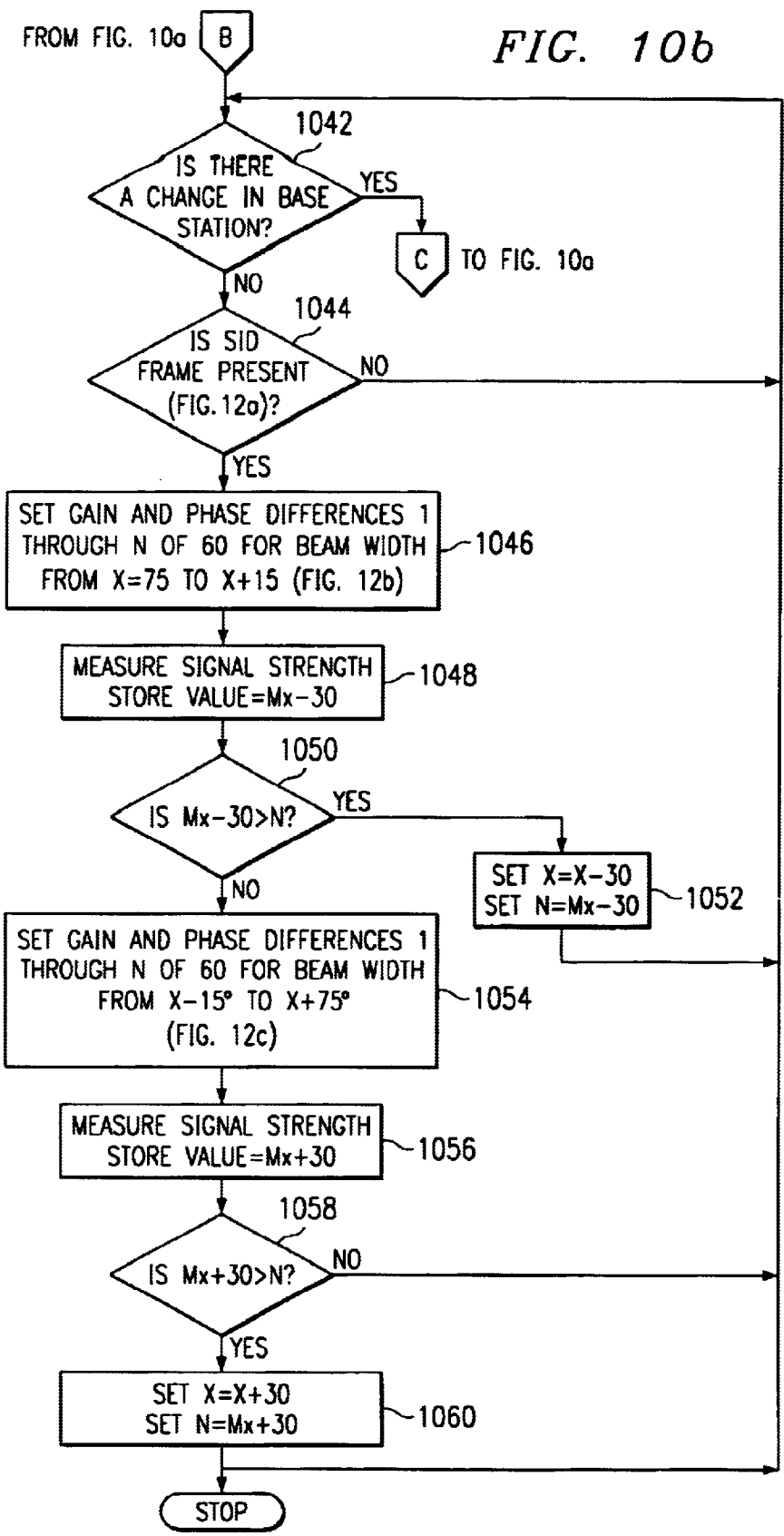
Figure 11A:
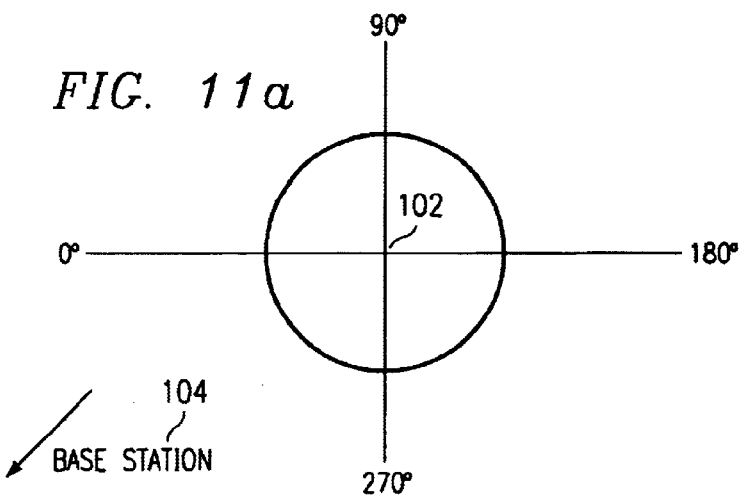
FIG. 11 illustrates directional antenna radiation patterns radiated during the process illustrated in the flowchart of FIG. 10.
Figure 11B:
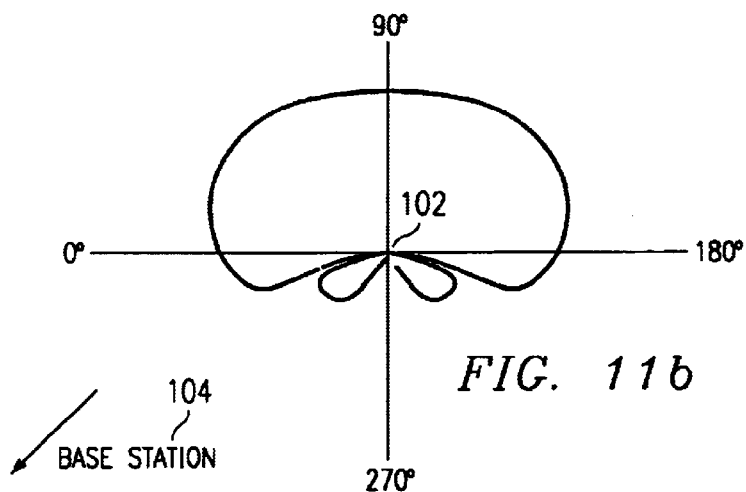
Figure 11C:
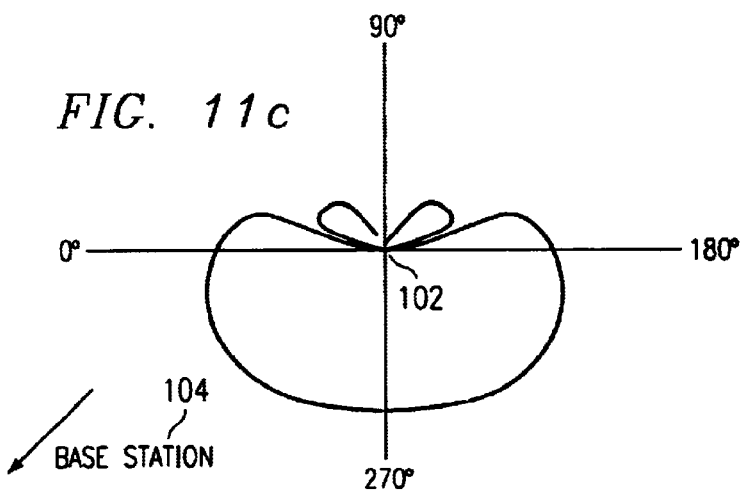
Figure 11D:
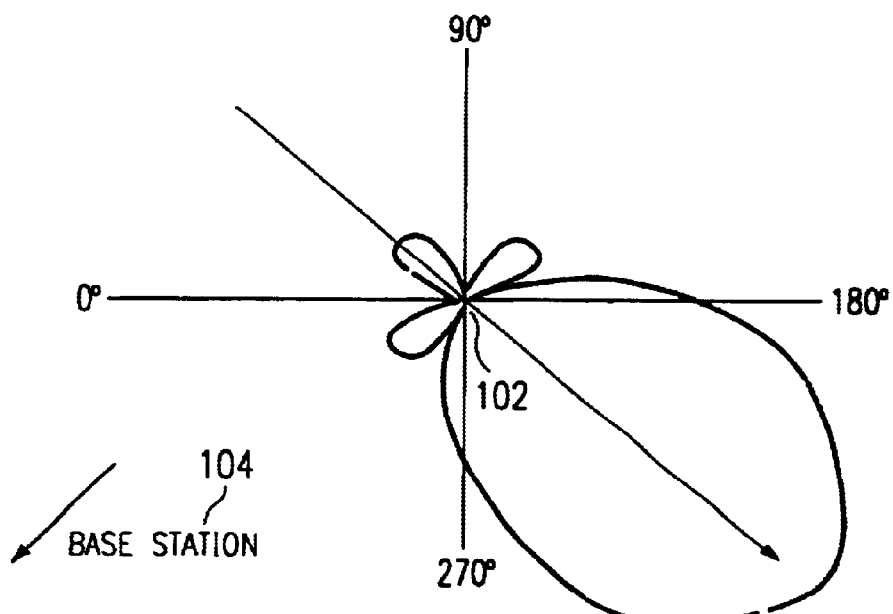
Figure 11E:
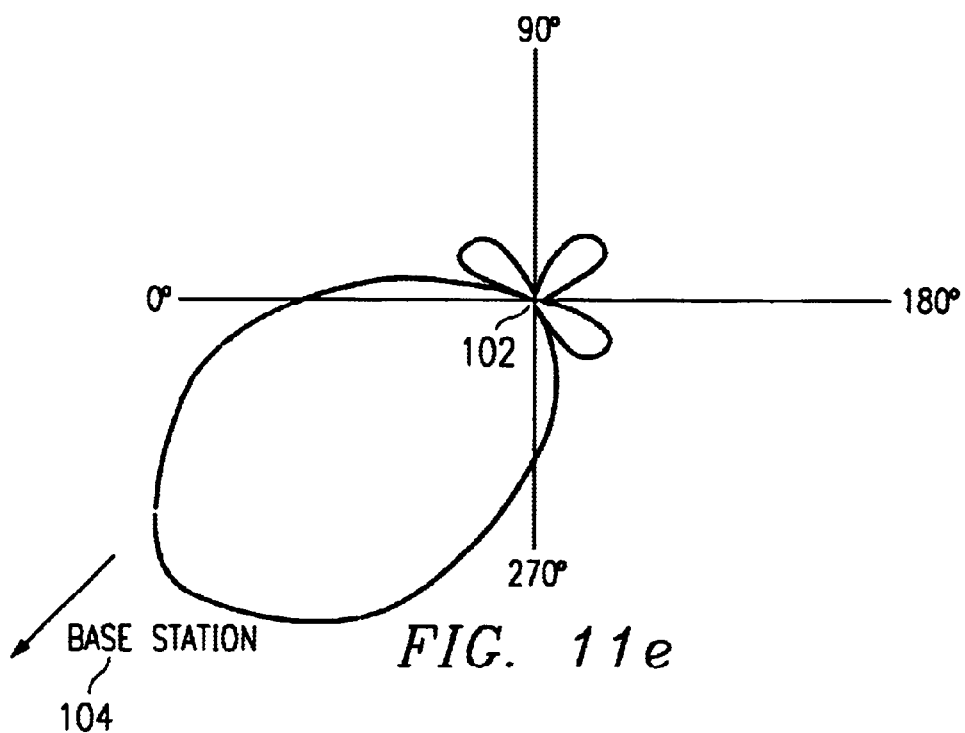

The flow chart of FIG. 10 starts at step 1002, and the gain and phase of gain and phase delay circuitry $60_1 \ldots 60_n$ of the embodiment of FIG. 4 are set at step 1004 for an omni-directional beam pattern as illustrated in FIG. 11(*a*). With an omni-directional beam pattern, a mobile station 102 is able to make communication with a least one base station 104, and typically more than one base station associated with respective cells within whose influence the mobile station 102 is located. At step 1006 the baseband circuitry comprised in the processing circuitry 406 of the embodiment illustrated in FIG. 4 decodes the BCCH signals received from respective base stations in order to determine their signal quality. Typically the measure of signal quality is a measure of the RSSI of the received signal. The mobile station 102 sets its receive carrier frequency to the selected base station, typically that providing the greatest RSSI, at step 1008. At step 1010 the signal quality may be measured again, typically the signal strength, and the value "N" stored.

At step 1012, the mobile station processing circuitry 406 determines whether or not a SID frame is present in the received traffic channel. If no SID frame is present then the process flow may return to step 1002, and the omni-directional beam pattern as illustrated in FIG. 11(*a*) maintained. If a SID frame is present then the yes arm of decision block 1012 is processed and the process flows to step 1014 in which the gain and phase for the gain and phase delay circuitry 60 are set for a beam width of zero to 180E, with a bore-sight direction X=90E relative to a suitable reference plane of the mobile station 102, as illustrated in FIG. 11(*b*). Process control then flows to step 1016 where the RSSI of the received CCH signal from the selected base station is stored as value "Mx". Control of the mobile station 102 then flows to decision block 1018 where it is determined whether or not the stored RSSI value MX is greater than the stored RSSI value N.

For MX greater than N control flows to step 1026, otherwise control flows to step 1020 where the gain and phase of the gain and phase delay circuitry 60 are set for a beam width from 180E to 360E, where the bore sight direction X equals 270E as shown in FIG. 11(*c*). Control then flows to step 1022 where the RSSI value MX of the BCCH signal of the selected base station is stored for the current antenna beam pattern. The stored value MX is then compared with the stored RSSI value N at step 1024. If RSSI value MX is less than N then control flows back to 1004. However, if MX is greater than N then the value of MX is assigned to N, and the new value N is stored at step 1026. Process control then flows to step 1028 where the gain and phase of gain and phase delay circuitry 60, are set to form a beam width from X–90E to X. A new boresight direction X is then set to equal the previous value for X–45E as illustrated in FIG. 11(*d*). The process then flows to step 1030 where the RSSI value MX is measured and stored. The process then flows to decision block 1032.

At decision block 1032 the current value of MX is compared with the current value assigned to N to determine whether or not MX is greater than N. If MX is greater than N then flow control jumps to step 1040. Otherwise flow control proceeds to step 1034 where the gain and phase of the gain and phase delay circuitry 60, are set to form a beam width of X to X+90E, where X is assigned a new value equal to the old value X+45E as shown in FIG. 11(*d*). Control then flows to step 1036 where the RSSI is measured and assigned to MX and stored. Process control then flows to decision block 1038 where it is determined whether or not MX is greater than N. If no, then the process control flows back to the start of the process, step 1004 and if yes flows to step 1040 at which point the current value MX is assigned to N. The process control then flows to decision block 1042.

Process control steps 1002 through to 1040 have initialised and set up the steerable beam antenna for the optimum beam direction for communication with the base station 104 designated for the mobile station 102.

The mobile station 102 now can be configured to operate in a second mode in which the optimum beam direction is tracked in order to maintain optimum communication with the base station as the mobile station 102 changes its orientation with respect to the base station 104. In a preferred embodiment tracking is achieved by steering the beam either side of the recorded optimum signal direction, e.g. ±30° to measure signal quality in those directions.

Figure 12A:
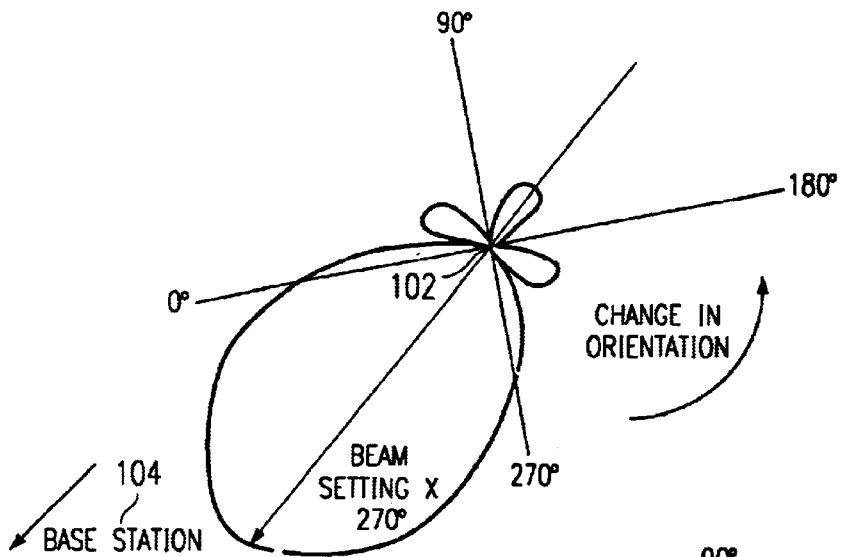
FIG. 12 illustrates further directional antenna radiation patterns radiated during the process illustrated in the flowchart of FIG. 10.
Figure 12B:
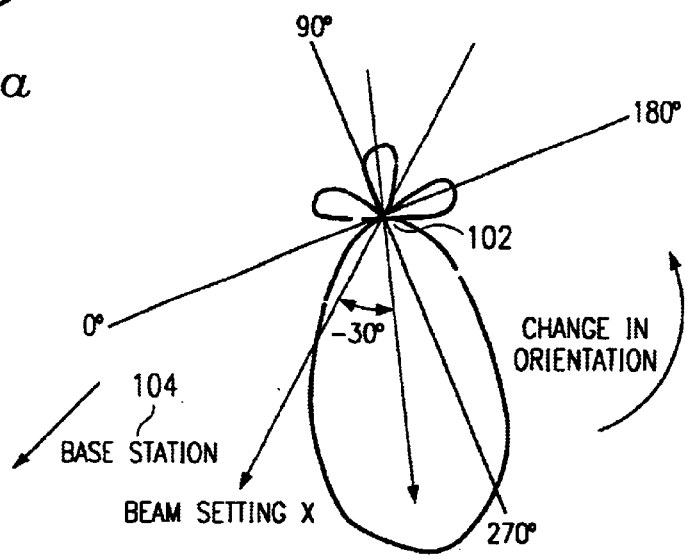
Figure 12C:
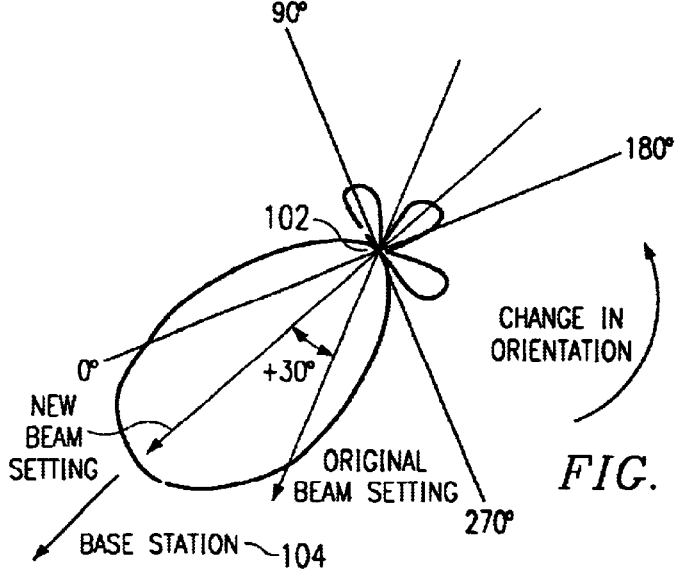

Having established an optimum communication link with a base station, it is necessary to determine whether or not there has been a request to hand off to another base station 104. Such an investigation may be initiated by the fact that the orientation of the mobile station as shown in FIG. 12(*a*) has changed and the antenna beam is no longer pointing directly at the base station 104. If it is determined that the base station has instructed a change in the base station with which the mobile station is communicating, then control of the process returns to the start, step 1002, and the base station either instructs the mobile station to enter the omnidirectional mode, or the mobile station does it automatically when instructed to change base station. Then the optimum antenna direction for the new base station is determined. Otherwise, when there is no change in base station, the process control flows to step 1044 where it is determined whether or not a SID frame is present in the traffic signal received by the mobile station 102. If no SID frame is present in the received traffic signal then the process flow control returns to step 1042 where a change in the base station is monitored. Otherwise, the gain and phase delay values for the gain and phase circuitry 60, are set to provide a beam width from X−75E to X+15E as shown in FIG. 12(*b*). Process control then flows to step 1048 where the RSSI value $MX_{-30}$ for the direction X−30E is determined, and stored. At step 1050 it is determined whether or not MX−30E is greater than N. If yes then at step 1052 X is assigned the value X−30E and N is set to equal MX−30.

Process control then flows to step 1042 in order to begin the tracking process again. However, if $MX_{-30}$ is not greater than N then process control flows to step 1054, and the gain and phase of the gain and phase delay circuitry 60, is set to provide a beamwidth extending from X−15E to X+75E as shown in FIG. 12(*c*). The process then flows to step 1156 where the RSSI value MX+30E for the direction X+30° is measured and stored. The value MX+30E is then compared with N to determine which is the greater. If MX+30E is greater than N then process control flows to step 1060 where X is assigned the value X+30 and N is assigned the value MX+30E. Otherwise process control flow returns to step 1042.

An adaptive antenna array, or other form of steerable antenna operated in accordance with the foregoing described process is able to identify an optimum beam direction, and track at optimum beam direction as the orientation of the mobile station is changed.

In the foregoing process the directional beam has been utilised to reject multipath beam reception, that is to say reception of beams which due to the environment and reflections from objects in the environment have taken multiple paths to arrive at the mobile station. In this manner the performance of the mobile station may be significantly improved. Due to the principle of reciprocity, there is a corresponding improvement in the signals received by the base station, or a lower transmit power for the same performance.

It will be appreciated that the process described above for identifying and tracking the optimum antenna beam direction is a "background" process for the mobile station 102, and may be interrupted at appropriate points in order for other operations of the mobile station 102 to be performed.

In an alternative embodiment decision blocks 1018, 1024, 1032, 1038, 1050 and 1058 also comprise a test for whether a SID frame is still present or not. If a SID frame is still present then the process flow continues. However, if a SID frame is not present then the process flow is stalled until a SID frame is present again. As mentioned above, the process flow in this alternative embodiment is a "background" process and may also be stalled at appropriate points in order for other operations of the mobile station 102 to be performed.

Although the operation of radio apparatus using a steerable beam antenna has been described above with reference to radio telephone 50, it will be evident to a person of ordinary skill in the art that a base station 108 may be operated in a corresponding fashion, and the present invention is not limited to radio telephones or mobile stations in general.

In the GSM cellular communication system, the speech traffic channel operates at a bit rate made up of two main components. The first component is the bit rate assigned to speech coding and the second component is the bit rate assigned to channel coding. In the GSM system, the total bit rate utilised for the traffic channel is fixed and comprises the sum of the speech coding bit rate and the channel coding bit rate. The GSM speech traffic channel may be operated in two main coding modes; the full rate (FR) traffic channel mode using 22.8 Kb/s and the half rate (HR) traffic channel mode using 11.4 Kb/s. The full rate mode has two possible coding schemes: full rate speech coding in which speech is encoded using 13 Kb/s and full rate channel coding using 9.8 Kb/s; and an enhanced full rate (EFR) speech coding which uses 12.2 Kb/s and a full rate channel coder which uses 10.6 (0.8+9.8) Kb/s. The EFR is the preferred implementation of speech coding since, although using fewer bits per second, it has higher quality and more faithful reproduction of speech than the plain FR coder.

Half rate speech coding uses only 5.6 Kb/s and the half rate channel coding only 5.8 Kb/s. The half rate speech coding system has a lower speech quality compared to the full rate or enhanced full rate coding systems described above and, consequently, this coding system is typically only used when a communications system operator lacks bandwidth capacity and chooses to offer a lower speech quality in order to squeeze as many traffic channels into their allocated bandwidth as possible.

Although system operators have limited flexibility in terms of the coding rates they choose to employ, they have to choose between full rate and half rate coding, i.e. a high speech quality system versus a poor speech quality system. Furthermore, the channel and speech coding bit rates are fixed for each of the full rate and half rate modes, no matter what the channel condition, i.e. whether it is a good or poor channel. If the channel condition is good, then channel coding takes up coding space (bits per second) which could be better utilised in speech coding to improve speech quality. Conversely, if the channel condition is poor then the channel coding may be insufficient to recover corrupted or lost bits and, therefore, speech quality is also very poor. In such an instance, it is desirable to allocate more bits for channel coding and error correction and less bits for speech coding.

To address these issues within the GSM cellular communications system, the European Telecommunications Standards Institute have produced document EN301XXXV2.0.0 (1999–02) "Digital Cellular Telecommunications System (Phase 2+); Adaptive Multi-Rate Speech Processing Functions"; general description (GSM) 06.71 version 2.0.0 release 1998, which proposes Adaptive Multi-Rate (AMR) Coding for Speech Traffic Channels within the GSM Cellular Communications System. The proposed AMR system still maintains a differentiation between full rate and half rate coding, but does provide some commonality between them. Table 1 below illustrates the various bit rates for full rate channel and half rate channel encoding, respectively, under the proposed adaptive mode rate system.

TABLE 1

| GSM AMR | |
|---|---|
| FULL RATE CHANNEL: 22.8 Kb/s | HALF RATE CHANNEL: 11.4 Kb/s |
| AMR Speech Modes | |
| 12.2 Kb/s (GSM EFR) | — |
| 10.2 Kb/s | — |
| 7.95 Kb/s | 7.95 Kb/s |
| 7.40 Kb/s | 7.40 Kb/s |
| 6.7 Kb/s | 6.7 Kb/s |
| 5.9 Kb/s | 5.9 Kb/s |
| 5.15 Kb/s | 5.15 Kb/s |
| 4.75 Kb/s | 4.75 Kb/s |

Cellular apparatus supporting either the full rate or the half rate (AMR) system is require to support all the mode rates under respective systems.

As can be seen from Table 1, different speech coding rates are available within either one of the full rate channel or half rate channel coding systems. The different speech coding rates mean that correspondingly different channel coding rates are possible. For example, if a channel condition was of only average quality then a speech coding rate of 7.95 Kb/s may be used and, consequently, a channel coding rate of 14.85 Kb/s would be utilised, whereas for a good channel a 12.2 Kb/s speech coding rate may be used with only 10.8 Kb/s utilised for channel coding.

Figure 6:
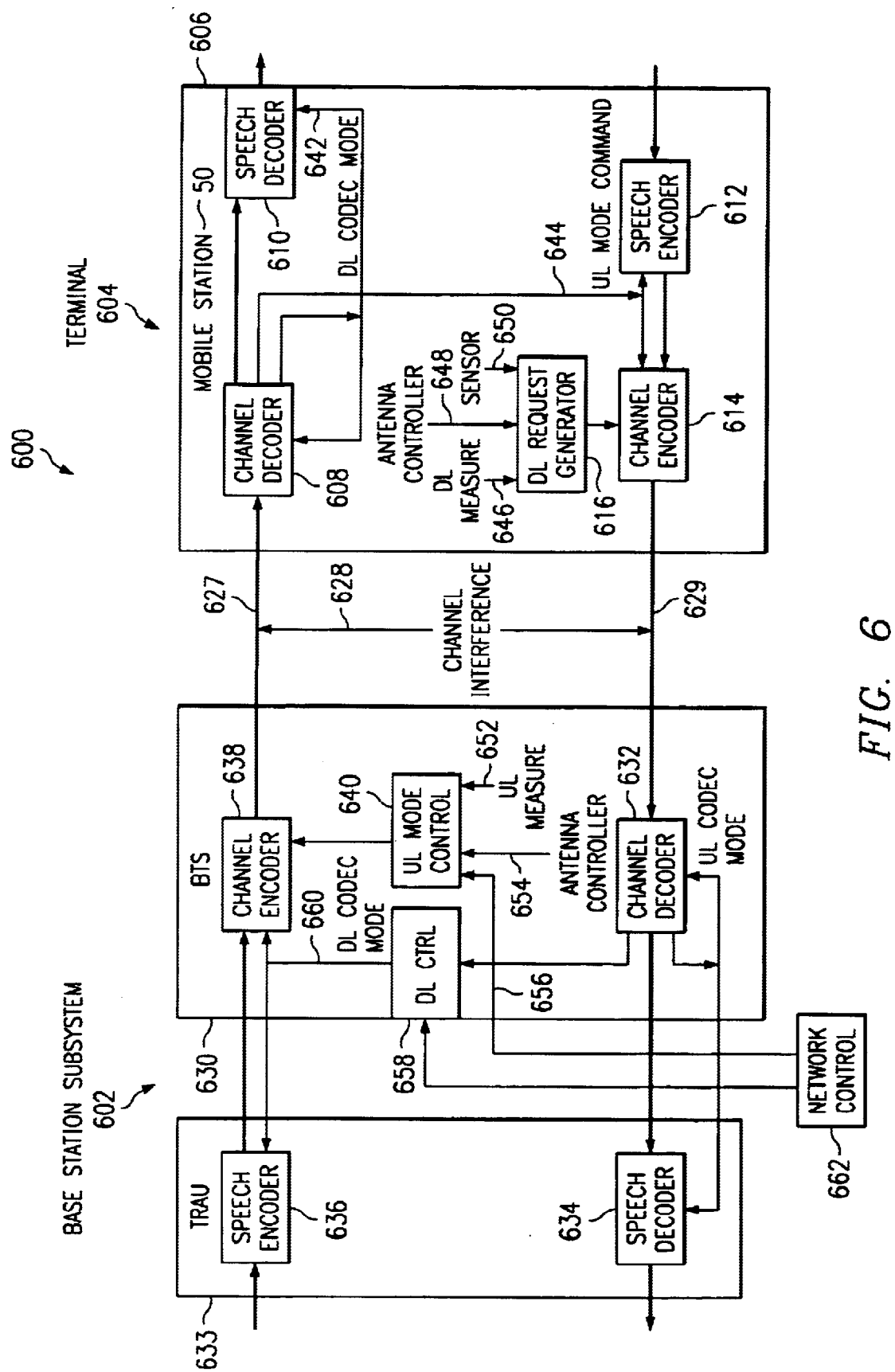
FIG. 6 is a diagrammatic illustration of a cellular telephone system in accordance with an embodiment of the invention.

FIG. 6 is a block diagram of a cellular telephone system 600 using AMR coding for both uplink and downlink communications in an exemplary embodiment of the present invention. On respective sides of the radio interface are a base station sub-system 602 and a terminal 604. The terminal 604 is a mobile station such as radio telephone 50 described above.

The mobile station 50 comprises a coding module 606 providing means for coding signals received or transmitted by the mobile station. On the receive side of the coding module 606, there is included a channel decoder 608 for decoding and error correcting signals received over air interface 628 on downlink channel 627 by the mobile station. The channel decoded speech data signals are then sent to a speech decoder 610 from where they are forwarded to a 13 bit uniform Pulse Code Modulated (PCM) signal to digital-to-analogue converter in an audio part of the mobile station.

The transmit side of the coding module 606 includes speech encoder 612 which encodes a 13 bit uniform PCM input signal from an analogue-to-digital converter in the audio part of the mobile station and forwards speech data signals to channel encoder 614. The channel encoder 614 further encodes the received speech data signal including providing error correction coding, for example.

The coding module 606 also includes downlink request generator 616 which inserts a request for a downlink speech coding rate change into channel encoder 614. The downlink request is incorporated into the channel coding by channel encoder 614 for transmission to the Base Station Sub-system (BSS) 602.

The BSS includes a Base Transceiver Station (BTS) 630 which, on the receive side, includes a channel decoder 632 for receiving signals transmitted over the air interface 628 on the uplink channel 629 and which decodes the transmitted signals and forwards the coded signals to speech decoder 634 in the Transcoder Rate Adapter Unit (TRAU) 633. Speech decoder 634 decodes the speech data signals received from channel decoder 632 into 13 bit uniform PCM speech signals which are sent to a 13 bit uniform PCM to 8 bit/A-law or µ-law PCM converter for further transmission over the PSTN or landline part of the wireless communications network.

On the transmitter side, TRAU 633 includes speech encoder 636 which receives 13 bit uniform PCM speech signals from an 8 bit/A-law or µ-law to 13 bit PCM converter. Speech data is forwarded from speech encoder 636 to channel encoder 638 in BTS 630. Channel encoder 638 also receives an Uplink mode control signal from Uplink mode controller 640, which is inserted into the channel coding and transmitted to mobile station 50. Uplink signal quality measure 652 and antenna control signal 654 are input to Uplink mode control 640, together with a network control input 656. Downlink control 658 receives Downlink control request signals from the channel decoder 632 and outputs Downlink codec mode signals 660 to channel encoder 638 for incorporating into the signal transmitted to the mobile station 50.

Considering the mobile station 50 in greater detail, channel decoder 608 not only forwards speech data to speech decoder 610 but also outputs a Downlink codec mode signal 642 and Uplink mode command signal 644 which are sent from the BTS 630 as in band signals in Downlink channel 627. The Downlink codec mode signal 642 is input to channel decoder 608 and speech decoder 610 which instructs respective channel decoder and speech decoders as to which speech mode has been used in the Downlink channel. Thus, respective channel decoder and speech decoders 608 and 610 can operate in accordance with the coding rate utilised in the Downlink channel.

The Uplink mode command 644 is input to speech encoder 612 and channel encoder 614 and instructs respective encoders as to which coding rates to utilise. Mobile station 50 further includes Downlink requests to generator 616 which outputs a Downlink coding mode request to channel encoder 614 for transmission to BTS 630. The Downlink request generator 616 has three input lines:

(i) Downlink quality measure 646;
(ii) antenna control module signal 648; and
(iii) motion sensor signal 650.

Downlink quality measure 646 signal originates from signal quality measurement unit 514 of control circuitry 406 and is indicative of the quality of the signal received over the Downlink channel 627. The signal quality may be based on one or more of the following parameters of the Downlink channel signal; signal to noise ratio, bit error rate and Receiving Signal Strength Indication (RSSI), for example. RSSI is commonly employed. In dependence on the Downlink signal quality measure, the Downlink request generator 616 requests the BSS 602 to utilise a different speech codec coding rate mode by inserting a Downlink mode request signal in the channel encoder 614.

The second input line to the Downlink request generator 616 is configured to communicate an antenna control signal 648 from the antenna control module 516 indicative of a change in the antenna beam direction, preferably capable of indicating when the optimum antenna beam direction has been identified and set. Optionally, the signal 648 communicated from antenna control module 516 may indicate switching of the antenna beam into an omni-directional mode, and switching operation of the antenna to a narrow beam width. The operation of the antenna control module 516 has been generally described with reference to the flowchart illustrated in FIG. 5, and in detail with reference to the flowchart illustrated in FIG. 10. In step 520 of the flowchart of FIG. 5, the antenna beam initialisation step, no signal 648 from the antenna control module 516 need be input to the Downlink request generator 616 since the antenna control module 516 has not yet begun optimisation of the antenna beam direction and therefore no changes in the antenna beam direction nor beam width will occur.

As the antenna control module 516 undertakes a search for the optimum antenna beam direction, so a narrowed beam, and the direction of the narrowed beam for the optimum signal, will be progressively identified, step 522. The optimum beam direction is set in step 524. For each intermediate step in the search routine, identification of the beamwidth and direction may initiate a signal originating from the antenna control module 516 on the antenna control signal 648 to the Downlink request generator 616 in order to initiate switching of coding modes responsive to the antenna control module 516 changing the antenna beam direction. However, since the intermediate identification steps would occur relatively quickly after each other, such intermediate switching is likely to occur sufficiently rapidly to impose an unacceptable processing overhead on the processing circuitry 406. Thus, it is preferable to only send an antenna control signal 648 when the optimum beam is identified, thereby indicating a good received BCCH signal, or when the omni-directional mode is initiated following a significant degradation in quality of the received BCCH signal.

In an exemplary embodiment, the mobile station 50 includes a motion sensor 70 for sensing motion of the mobile station. The motion sensor 70 outputs a motion sensor signal 650 in response to movement of the mobile station 50 detected by the motion sensor. In a preferred embodiment, motion sensor 70 outputs signal 650 in response to rapid or sudden motion of the mobile station. Responsive to receiving signal 650, the Downlink request generator 616 inhibits the sending of Downlink mode request signals. Signal 650 may comprise a pulse signal indicative of motion being sensed wherein the Downlink request generator 616 is configured to inhibit sending of Downlink mode request messages for a predetermined time period after receiving the pulse signal 650. Optionally, signal 650 may be a level signal, either active high or active low, which is asserted during sensing of motion of the mobile station. The Downlink request generator 616 is responsive to inhibit sending Downlink mode request messages whilst signal 650 is active.

In a preferred embodiment of the invention, the coding module 606 is a part of control circuitry 406 and may comprise a digital signal processor, general purpose processor or other circuitry appropriately configured by way of computer program instructions, for example, to implement the respective channel and speech coding modules 608,610, 612 and 614 and Downlink request generator 616 illustrated in FIG. 6.

Figure 7:
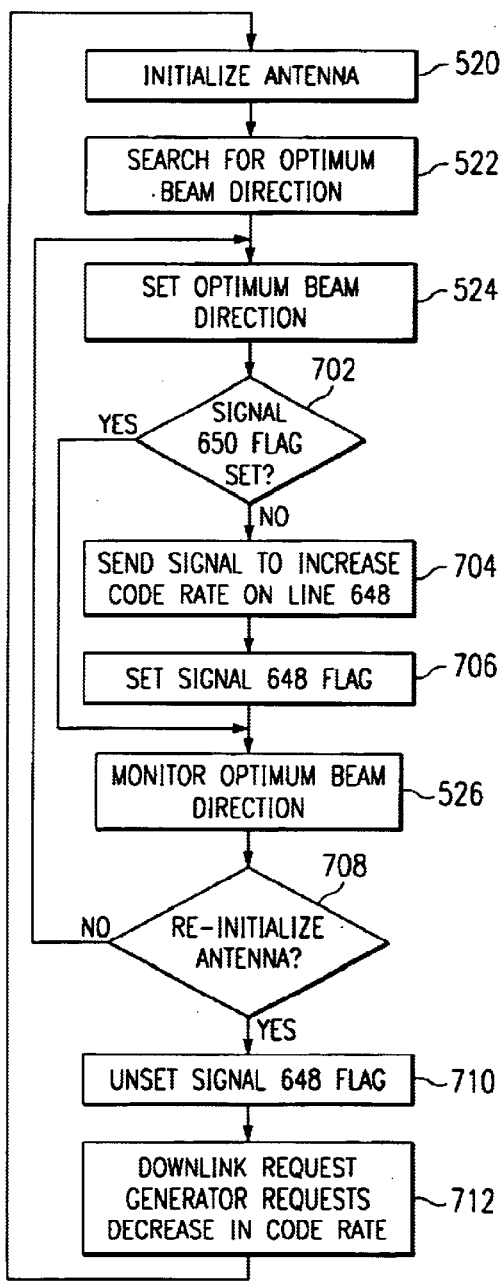
FIG. 7 is a flow chart for operating the mobile station illustrated in FIG. 6 in accordance with an embodiment of the invention.

The operation of the antenna control module 516 will now be described in greater detail with reference to the flowchart illustrated in FIG. 7. The antenna beam is initialised at step 520 to form an omni-directional antenna beam. In the preferred embodiment, step 520 comprises steps 1002 to 1004 of the flowchart illustrated in FIG. 10. From this initialised setup, the search for an optimum beam direction is undertaken at step 522 and the optimum beam direction determined and set at step 524. For the preferred embodiment, steps 522 and 524 comprise steps 1006 to 1040 of the flowchart illustrated in FIG. 10. At step 702, the antenna control module 516 determines whether a motion signal 650 flag is set indicating that a signal 650 has been received from the motion sensor 70 responding to movement of the mobile station. If the result of the test at step 702 is "yes" then operation of antenna control module 516 flows to step 526. However, if the result of the test at step 702 is "no", then an antenna control signal 648 is sent to the Downlink request generator to increase the speech code rate on the Downlink channel, at step 704. The antenna control signal 648 flag is then set at step 706.

Preferably, the Downlink request generator is also configurable to request an increase in the speech code rate on the up-link channel.

At step 526, the antenna control module 516 monitors the optimum beam direction and preferably comprises steps 1042 to 1060 of the flowchart illustrated in FIG. 10. At step 708 a check is conducted to determine whether or not the received BCCH signal has degraded sufficiently to prompt re-initialisation of the antenna beam. If the result of test 708 is "no" then operation of antenna control module 516 flows to step 524 where the optimum beam direction is set. The optimum beam direction set at step 524 may be the previous optimum beam direction or optionally may be a new optimum beam direction determined during step 526.

However, if the result of the test at step 708 is "yes" then the antenna control signal 648 flag is unset at step 710 and a signal to decrease the speech code rate utilised on the Downlink channel is sent to the Downlink request generator at step 712. Subsequently, the antenna is reinitialised at step 520 by forming an omni-directional beam antenna.

Figure 8:
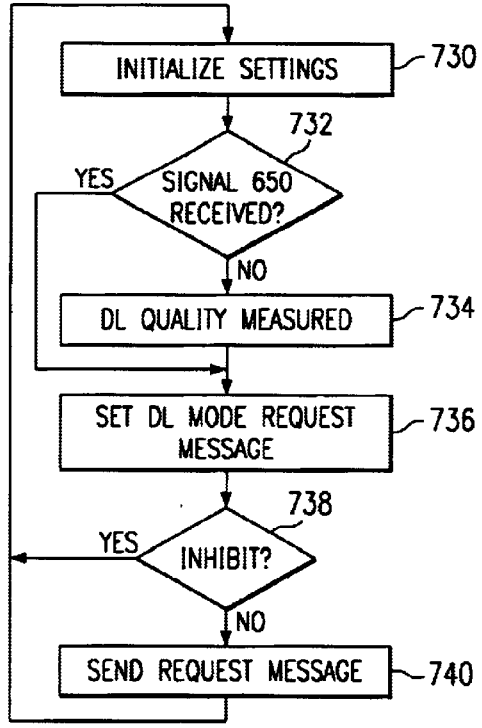
FIG. 8 is a flowchart for operating the mobile station illustrated in FIG. 6 in accordance with an embodiment of the invention.

Operation of the Downlink request generator 616 will now be described with reference to the flowchart illustrated in FIG. 8 of the drawings.

At step 730, the Downlink request generator 616 is initialised to ensure that no "Downlink" code request messages are present in any of its buffers and that other flags or settings are in a quiescent state. At step 732 it is determined whether or not an antenna control signal 648 has been received from the antenna control module 516. If the result of the test at step 732 is "yes" then a Downlink mode request message is generated at step 736 corresponding to antenna control signal 648 being a request to increase or decrease the code rate in the Downlink channel or requesting use of a particular speech coding rate for the Downlink channel. If the result of the test at step 732 is "no" then operation of the Downlink request generator 616 flows to step 734 where the Downlink quality measure is determined and an appropriate Downlink mode request message generated at step 736.

Once a Downlink mode request message has been generated at step 736, operation of the antenna control module 516 flows to step 738 where it is determined whether or not a motion signal 650 from motion sensor 70 has been received which inhibits transmission of any Downlink mode request message. If the result of step 738 is "yes" then operation of the antenna control module 516 flows back to step 730 where the Downlink request generator 616 is initialised. If the result at step 738 is "no", then the Downlink mode request message is sent to the BTS 630 by inserting the Downlink mode request message into the channel encoder, step 740. From step 740 operation of the antenna control module 516 flows back to step 730 where Downlink request generator 616 is initialised.

In an optional embodiment, the test to determine whether or not a motion signal 650 has been received from motion sensor 70 to inhibit transmission of Downlink mode request message may be inserted before step 736, in order to avoid unnecessary generation of the Downlink mode request message, thereby reducing the processing overhead on the antenna control module 516.

The downlink mode request message inserted by channel decoder 614 into the transmitted signal is extracted by the channel decoder 632 in the BTS 630. The downlink mode request message is forwarded to the downlink controller 658 which generates a downlink codec mode signal 660 for inputting to the channel encoder 638. Downlink controller 658 also receives an input from the network controller 662 which can also influence the downlink controller 658 to output a particular downlink codec mode signal 660, in accordance with a prevailing network requirement. The channel encoder 638 incorporates the downlink codec mode signal 660 into the signal to be transmitted to the mobile station 50. In this way, the mobile station 50 is able to influence the downlink speech coding rate by making appropriate requests to the BSS 602.

The BTS 630 also includes an uplink mode controller 640, which receives an uplink signal quality measure 652, an antenna control signal 654 and a network control signal 656 from the network controller 662. In respect of the antenna control signal 654 and uplink signal quality measure 652, the operation of the uplink mode controller 640 is substantially as previously described with reference to the flowcharts illustrated in FIGS. 7 and 8, with reference to the antenna controller 648 and downlink measurement signal 646 of the mobile station 50. Evidently, the uplink mode controller 640 will not have a motion sensor signal, since the BTS 630 is fixed. Selection of an uplink coding rate via the uplink mode controller 640 is made in dependence upon the antenna control signal 654 and the uplink signal quality measure 652 substantially as described in the foregoing. A further influence on the uplink mode controller 640 is the network control signal 656, which can determine the uplink coding rates, in accordance with prevailing network requirements. The uplink mode command is output from the uplink mode controller 640 to the channel encoder 638 where it is incorporated in a signal to be transmitted to the mobile station 50.

In the foregoing-described embodiments, the cellular telephone system 600 is configured such that the BSS 602 controls or commands which speech coding rates are to be used for the uplink and downlink channels. The mobile station 50 can merely request a speech coding rate. In an optional embodiment, the mobile station 50 may be configured to control the speech coding rates utilised by the respective encoders and decoders on the uplink and downlink channels. For example, the mobile station 50 may switch coding rates for transmissions on the uplink channel, and send a message indicating that switch, in response to the antenna beam being aligned in an optimum direction outside of the control of the BSS 602. Various other modifications and configurations will be evident to a person of ordinary skill.

In the preferred embodiment, identification of an optimum beam direction or a change in radiation pattern or beam direction occurs during unused parts of SID frame or frames. By using such frames containing no useful information, speech code rates may be modified in accordance with channel quality prior to, and without the need to, measure and monoitor the channel quality during speech transmission. Thus, changes in speech code rate may be achieved more quickly and responsively than in known systems relying on measurements of channel quality during speech transmission.

In a further embodiment of a mobile station 50 including an orientation or motion sensor 70, the code rate controller, such as downlink generator 616 may be configured to determine a period during which the mobile station 50 has remained stationary. The code rate controller may achieve this by monitoring a time period since a last signal from the orientation or motion sensor 70 indicating a change in orientation or motion of the mobile station 50. Optionally, the orientation or motion sensor 70 may be configured to output a signal indicative of the mobile station 50 being stationary. In this regard, the word "stationary" does not imply absolute stillness, but a lack of motion which is sufficient for the mobile station 50 to be considered motionless with regard to the purpose of the present invention.

Responsive to the mobile station 50 being stationary, the coding rate controller may be configured to request a switch between non-adjacent coding rates. That is to say an increase by more than one coding rate.

In view of the foregoing description it will be evident to a person skilled in the art that various modifications may be made within the scope of the invention. For example, although embodiments of the invention have been described with reference to adaptive multi-rate coding for speech traffic channels as proposed by ETSI, the ordinarily skilled person would readily understand that the principles described above by way of particular examples may be applied to other communications systems and not just cellular communications systems or speech traffic channels.

Additionally, searching for an optimum antenna beam direction or profile may be conducted in other periods of inactivity such as that following an end of data signal or footer in a data signal.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during the prosecution of this application or of any such further application derived therefrom. In particular, with reference to the appended claims, features from dependent claims may be combined with those of the independent claims and features from respective independent claims may be combined in any appropriate manner and not merely in the specific combinations enumerated in the claims.

What is claimed is:

1. Apparatus for a wireless communications network, comprising:

an antenna system capable of both omnidirectional and directional operation;

an antenna controller for directing said antenna system to operate with omnidirectional operation and, in response to said onmidirectional operation, directing said antenna system to operate in an optimum signal quality direction; and coding means operable at two or more coding rates, and responsive to said antenna controller initiating a change in a direction of said antenna system to switch between said two or more coding rate.

2. Apparatus for a wireless communications network, the apparatus comprising:

an antenna system capable of both omnidirectional and directional operation;

an antenna controller for directing said antenna system to operate with omnidirectional operation and, in response to said onmidirectional operation, directing said antenna system to operate in an optimum signal quality direction;

means for determining a period of inactivity for said apparatus;

means for determining signal quality of a signal received during said period of inactivity; and coding means operable at two or more coding rates and responsive to a determined signal quality to switch between said two or more coding rates.

3. Apparatus according to claim 2, further comprising:

a directional beam antenna; and an antenna controller for directing said directional beam antenna in an optimum signal quality direction in accordance with said determined signal quality, said coding means responsive to said antenna controller initiating a change in said antenna beam direction to switch between said coding rates.

4. Apparatus according to claim 3, said signal received during said period of inactivity comprising a broadcast signal.

5. Apparatus according to claim 4, operable for a cellular radio communications system, said broadcast signal comprising a signal from a base station with which said apparatus is in primary communication.

6. Apparatus according to claim 4, operable for a cellular radio communications system, said broadcast signal comprising a signal from any one of one or more base stations for cells adjacent the cell defined by said base station with which said radio communication system is in primary communication.

7. Apparatus according to claim 2, wherein said period of inactivity comprises a period determined as being designated for the transmission and/or reception of redundant information.

8. Apparatus according to claim 2, operable for speech communication, said period of inactivity comprising non-active segments during transmission and/or reception of silence identity (SID) information.

9. Apparatus according to claim 8, said non-active segments comprising an empty frame and/or part thereof during transmission of SID frames.

10. Apparatus according to claim 2, operable to transmit data, said period of inactivity comprising a period subsequent to an end of data signal transmitted and/or received by a radio apparatus.

11. Apparatus according to claim 2, wherein said coding means is a speech coder.

12. Apparatus according to claim 11, said coding means being operable to switch to higher rate coding responsive to said antenna controller initiating directing said antenna beam towards said optimum signal quality direction.

13. Apparatus according to claim 11, operable to communicate a request to second wireless communications apparatus in communication with the said apparatus to utilize said higher rate coding responsive to said antenna controller initiating directing said antenna beam towards said optimum signal quality direction.

14. Apparatus according to claim 11, said coding means operable to switch to a higher rate coding mode responsive to a rate switch request communicated thereto from a second wireless communications apparatus.

15. Apparatus according to claim 11, said coding means operable to utilise a coding rate corresponding to a coding rate utilize by a second wireless communication apparatus in communication with the said apparatus.

16. Apparatus according to claim 11, further comprising motion sensing means, said coding means responsive to a signal from said motion sensing means indicative of motion of the said apparatus to inhibit said coding means switching or requesting switching of coding rates.

17. Apparatus according to claim 11, further comprising an orientation sensitive sensing means, said coding means responsive to a signal from said sensing means indicative of a change of orientation of the said apparatus to inhibit said coding means switching or requesting switching of coding rate.

18. Apparatus according to claim 16, said coding means responsive to a signal from said sensing means indicative of a sudden movement or change of orientation.

19. Apparatus according to claim 16, responsive to a signal from said sensing means indicative of said apparatus being stationary to switch or request switching between non-adjacent coding rates.

20. Apparatus for a wireless communication network, comprising:
an antenna system capable of both omnidirectional and directional operation;
an antenna controller for directing said antenna system to operate with omnidirectional operation and, in response to said onmidirectional operation, directing said antenna system to operate in an optimum signal quality direction;
coding means operable at two or more coding rates and responsive to control signals to switch between said two or more coding rates; and a motion sensing means;
said coding means responsive to a signal from said motion sensing means indicative of a change of orientation of said apparatus to inhibit switching of said coding means between said two or more rates.

21. Apparatus for a wireless communication network, comprising:
an antenna system capable of both omnidirectional and directional operation;
an antenna controller for directing said antenna system to operate with omnidirectional operation and, in response to said onmidirectional operation, directing said antenna system to operate in an optimum signal quality direction;
coding means operable at two or more coding rates and responsive to control signals to request a transmitter in communication with said apparatus to switch between one of two or more coding rates; and
an orientation sensitive sensor;
said coding means responsive to a signal from said orientation sensitive senor indicative of a change of orientation of said apparatus to inhibit said request to said transmitter.

22. Apparatus for a wireless communication network, comprising:
an antenna system capable of both omnidirectional and directional operation;
an antenna controller for directing said antenna system to operate with omnidirectional operation and, in response to said onmidirectional operation, directing said antenna system to operate in an optimum signal quality direction;
coding means operable at two or more coding rates and responsive to control signals to switch between said two or more coding rates; and
motion sensing means;
said coding means responsive to a signal from said motion sensing means indicative of said apparatus being stationary to switch or request switching between non-adjacent coding rates.

23. A method for operating wireless apparatus having a directional beam antenna in a wireless communications network, the method comprising:
providing an antenna system capable of both omnidirectional and directional operation;
providing an antenna controller for directing said antenna system to operate with omnidirectional operation and, in response to said onmidirectional operation, directing said antenna system to operate in an optimum signal quality direction;
determining signal quality and initiating a change in antenna beam direction in accordance with said signal quality; and
switching between two or more coding rates for communications by said wireless apparatus responsive to said initiating a change in said antenna beam width.

24. A method for operating wireless apparatus, comprising:
providing an antenna system capable of both omnidirectional and directional operation;
providing an antenna controller for directing said antenna system to operate with omnidirectional operation and, in response to said onmidirectional operation, directing said antenna system to operate in an optimum signal quality direction;

determining a period of inactivity for said apparatus;

determining signal quality of a signal received during said period of inactivity; and switching between two or more coding rates for communications by said wireless apparatus responsive to a determined signal quality.

25. A method according to claim 23, further comprising directing said directional beam antenna to an optimum beam direction in accordance with said signal quality; and switching between said two or more coding rates responsive to initiation of a change in antenna beam direction.

26. A method according to claim 24, said signal comprising a broadcast signal.

27. A method according to claim 26, operable for a cellular radio communications system, said broadcast signal comprising a signal from a base station with which said radio apparatus is in primary communication.

28. A method according to claim 26, operable for a cellular radio communications system, said broadcast signal comprising a signal from any one of one or more base stations for cells adjacent the cell defined by said base station with which said radio apparatus is in primary communication.

29. A method according to claim 28, further comprising determining and storing optimum beam directions for said signal from any one of one or more base stations, for utilisation during a subsequent hand-over operation to a one of said one or more base stations.

30. A method according to claim 24, further comprising determining a period designated for transmission and/or reception of redundant information for said radio apparatus.

31. A method according to claim 24, for speech communications, further comprising determining a non-active segment during transmission and/or reception of silence identity (SID) information.

32. A method according to claim 31, said non-active segment comprising empty frames and/or part thereof during transmission and/or reception of SID frames.

33. A method according to claim 24, for data communications, further comprising determining an end of data signal transmitted and/or received by said radio apparatus.

34. A method according to claim 24, further comprising switching to a higher rate speech coding for said directional beam antenna being directed in said optimum signal quality beam direction.

35. A method according to claim 34, further comprising requesting a second wireless apparatus in communication with said wireless apparatus to utilize said higher rate speech coding for said directional beam antenna being directed in said optimum signal quality beam direction.

36. A method according to claim 34, further comprising switching to said higher rate speech coding mode in response to receiving a rate switch request from a second wireless apparatus in communication with said wireless apparatus.

37. A method according to claim 23, further comprising utilising a coding rate utilised by a second wireless apparatus in communication with said wireless apparatus.

38. A method according to claim 23, further including switching between said coding rates in response to sensing movement of said wireless apparatus.

* * * * *